United States Patent
Typpo et al.

[11] Patent Number: 6,145,211
[45] Date of Patent: Nov. 14, 2000

[54] CONTACTING THICKNESS GAUGE FOR MOVING SHEET MATERIAL

[75] Inventors: Pekka M. Typpo, Cupertino; Harold Welch, San Jose, both of Calif.

[73] Assignee: Impact Systems, Inc., Los Gatos, Calif.

[21] Appl. No.: 09/215,735

[22] Filed: Dec. 17, 1998

[51] Int. Cl.$^7$ .............................. B65H 7/12; B65H 7/02; G01B 7/06; G01B 3/00

[52] U.S. Cl. ..................................... 33/501.02; 33/501.03; 33/501.04; 324/229; 324/231; 271/262; 271/265.04

[58] Field of Search ........................... 33/501.02, 501.03, 33/501.04; 324/229, 231; 271/262, 265.04

[56] References Cited

U.S. PATENT DOCUMENTS

| | | | |
|---|---|---|---|
| 2,517,379 | 8/1950 | Backhouse | 271/262 |
| 4,134,211 | 1/1979 | Typpo et al. | 33/501.02 |
| 4,791,367 | 12/1988 | Typpo | 324/229 |
| 4,901,445 | 2/1990 | Boissevain et al. | 33/501.02 |
| 5,074,050 | 12/1991 | Williams et al. | 33/501.03 |
| 5,132,619 | 7/1992 | Typpo | 324/231 |
| 5,297,062 | 3/1994 | Cresson et al. | 324/229 |

*Primary Examiner*—Randy W. Gibson
*Attorney, Agent, or Firm*—Jerry G. Wright; Flehr Hohbach Test Albritton & Herbert LLP

[57] ABSTRACT

A caliper gauge for moving sheet material such as paper which measures the thickness of the paper accommodates bumps or holes in the paper by providing at least one side of the caliper gauge with a long continuous smooth arm which because of its mounting in close proximity to the moving sheet, which is partially made possible by the use of air bearings for the upper and lower portions of the gauge, provides a gradual wedge-shaped opening which thus allows the transfer of the momentum of the bump or hole in the paper to gradually overcome the inertia of the measuring arm which is pushed away from the paper. The arm itself is made of a single piece of sapphire and is universally pivoted by the use of a polyimide material adhered to the top of the arm which gives the arm at least 2° of dimensional freedom while still maintaining it aligned in the moving direction of the paper.

15 Claims, 3 Drawing Sheets

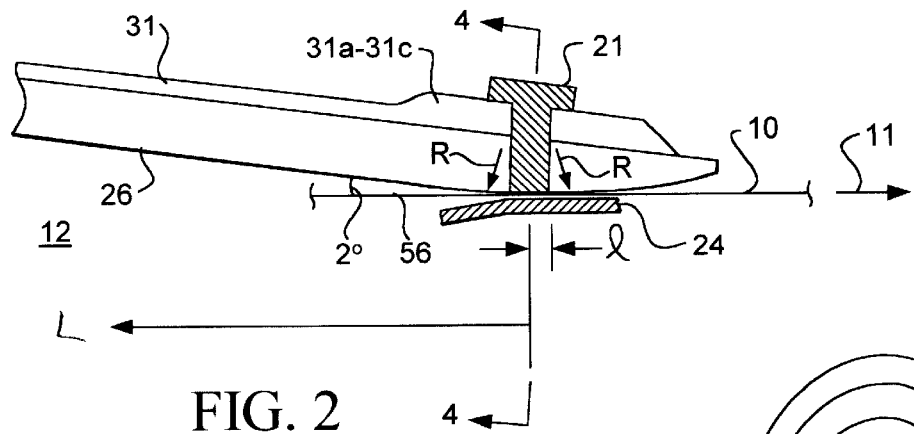
FIG. 2
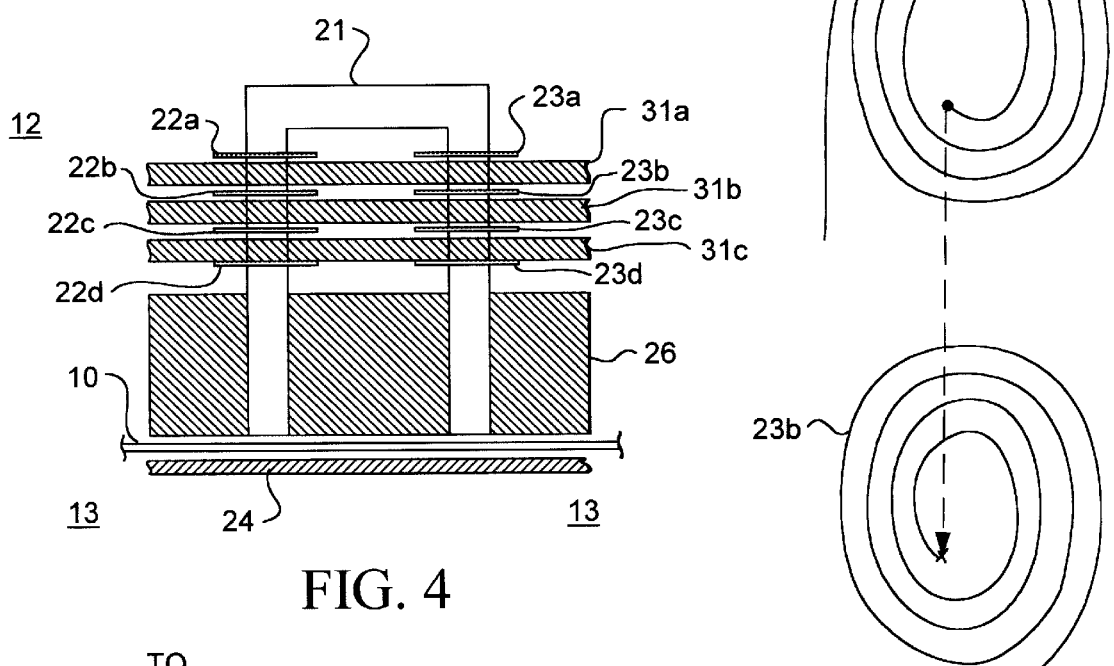
FIG. 4
FIG. 5
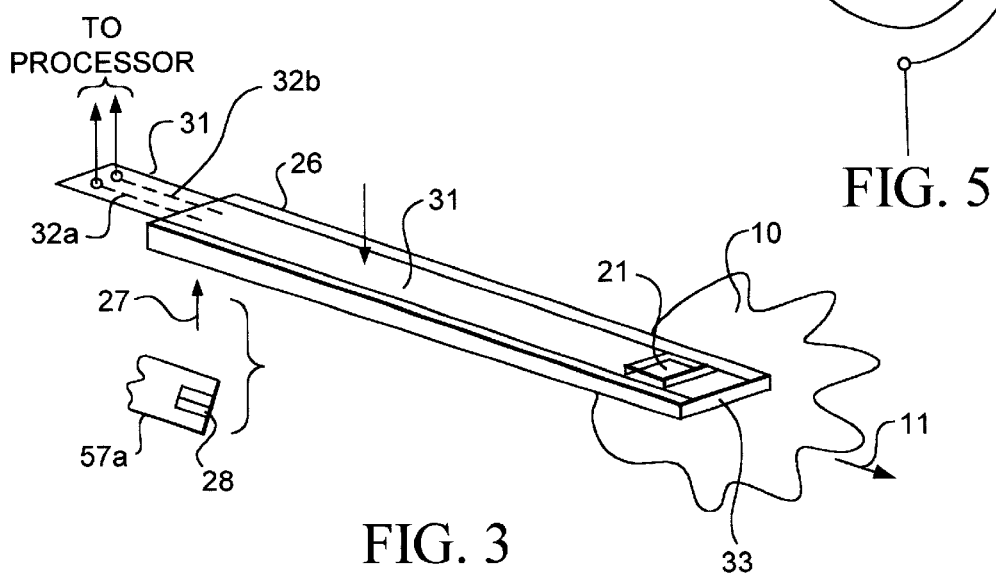
FIG. 3

6,145,211

1

CONTACTING THICKNESS GAUGE FOR MOVING SHEET MATERIAL

INTRODUCTION

The present invention is directed to a contacting thickness gauge for moving sheet material, and more particularly for measuring the caliper of paper.

BACKGROUND

In the measurement of the caliper of paper, caliper gauges are of both the contacting and non-contacting types. Contacting gauges are believed to be more reliable (or accurate) but because they bear against the sheet material they may cause tearing or other unwanted effects. In addition to the fact that the sheet material (such as newsprint) is fluttering and shifting, the paper material may contain unwanted bumps or other discontinuities such as holes. This is especially true in the case of recycled-type newsprint. And where the paper sheet may be moving at a speed of as much as 20 meters per second, a small tear may propagate across the entire sheet. This may also be the case where later in the process the sheet is being coated and there again the sheet if it has a slight tear in it is susceptible to a rip across its entire width.

While a non-contacting gauge which, for example, might utilize air jets to space the gauge from the surface avoids the foregoing problem somewhat, it is less reliable and in general less accurate.

OBJECT AND SUMMARY OF INVENTION

It is therefore a general object of the present invention to provide an improved contacting thickness gauge for moving sheet material.

In accordance with the above object, there is provided a contacting thickness gauge for moving sheet material having imperfections in the form of bumps or holes which may cause tears when passing through the gauge comprising upper and lower means on opposite sides of the sheet for carrying first and second magnetic circuit means for measuring the thickness. The upper and lower means include air bearing means with a plurality of spaced air exists tending to flatten a portion of the sheet encompassed by the air bearing means and to provide a relatively small gap between the upper and lower means through which the sheet passes. One of the upper and lower means includes a continuous smooth arm having two ends with one end including the first magnetic circuit means in substantial contact with the moving sheet, and the other end being universally pivoted, the arm forming a continuous, gradual, smooth wedge-shaped opening for the moving sheet.

BRIEF DESCRIPTION OF THE DRAWINGS

FIG. 2 is an enlarged, cross-sectional detailed view of a portion of FIG. 1. FIG. 3 is a perspective view of FIG. 2 with added components.

FIG. 4 is an enlarged, cross-sectional view taken along the line 4—4 of FIG. 2.

FIG. 5 is a circuit diagram of a portion of FIG. 4.

2

DESCRIPTION OF PREFERRED EMBODIMENT

Figure 1:
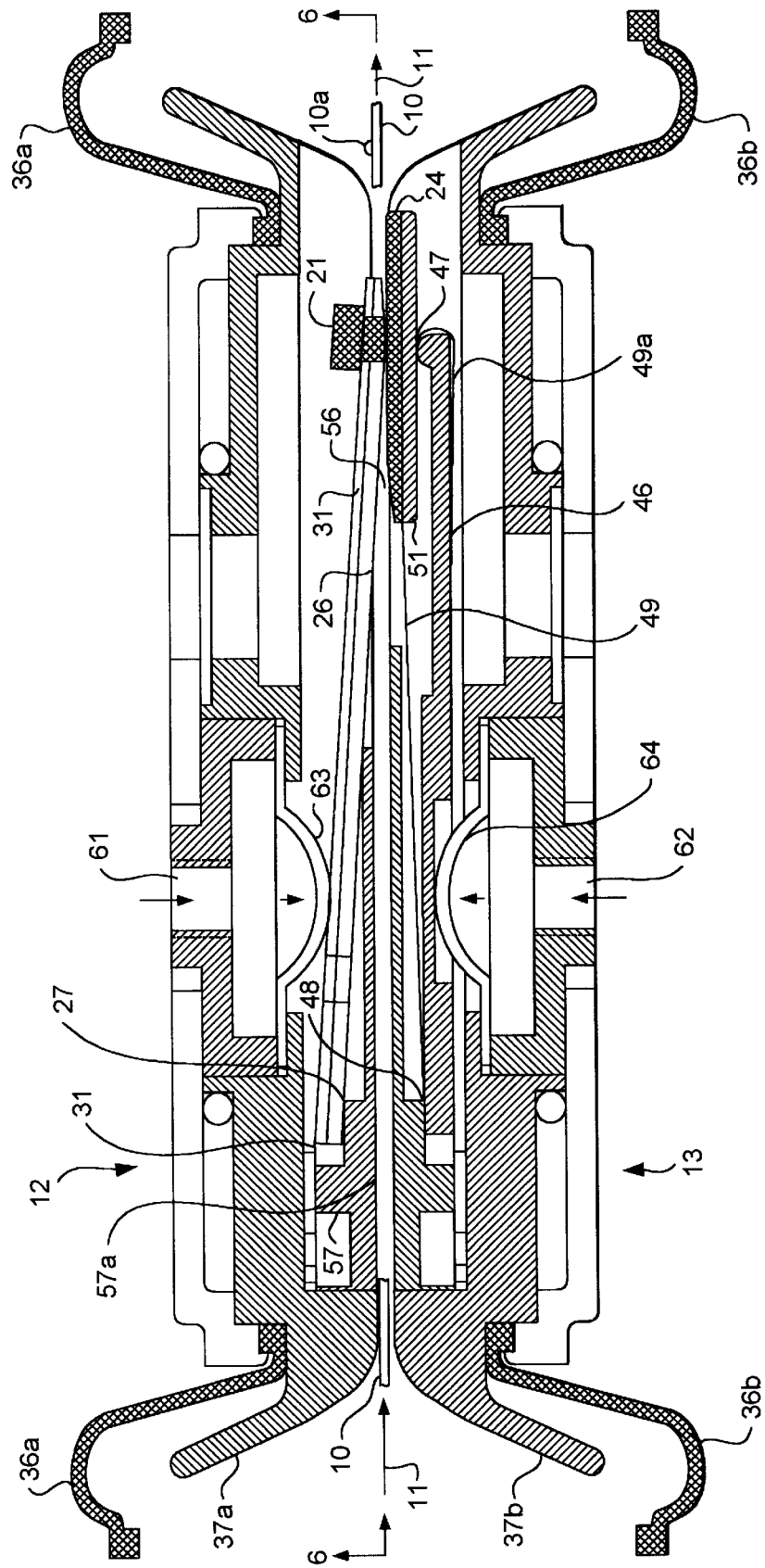
FIG. 1 is a cross-sectional view of a scanning-type thickness (caliper) gauge embodying the present invention.

Referring to FIG. 1, the thickness or caliper gauge of the present invention is used in conjunction with a scanner with traverses across the moving paper 10 which moves in a direction as shown by the arrows 11. Thus, the scanning direction of the caliper gauge is perpendicular to the direction 11 but in the same plane. On opposite sides of sheet 11 is upper scanning head 12 and a lower scanning head 13. The gap between the scanning heads accommodates the moving sheet or paper 10. Upper and lower scanning heads 12 and 13 are suspended and mounted for transversal from a frame consisting of upper and lower beams with side supports which are affixed to the floor (not shown).

To measure the caliper or thickness of the paper, first and second or upper and lower magnetic circuit means are used. FIG. 4 illustrates these by themselves which includes a U-shaped magnetic (ferrite) pole piece 21 with each leg of the pole piece having four inductive coils wrapped around; namely 22a–22d and 23a–23d. Coils for each leg are connected in series, that is 22a–22d and 23a–23d, as briefly indicated in FIG. 5 where coils 22a and 22b are shown. Lower head 13 contains a passive magnetic circuit which is merely an elongated slab 24 of ferrite material. Thus, the flux pass which is established extends through the pole piece 21 through the paper and then the return piece 24. The gap between them is a measure of the caliper of the paper 10. Such magnetic circuit is also illustrated in U.S. Pat. No. 4,791,367. However, other physical characteristics of that gauge are different.

The magnetic circuit means of FIG. 4 is mounted on a continuous smooth arm 26 as also shown in FIG. 2 which is mounted in upper scanning head 12 the arm being in the preferred embodiment made of a single piece of sapphire. It is shown in perspective view in FIG. 3 with the one end containing the active magnetic circuit 21 making line contact 33 with the moving paper 10 and with the other end being universally pivoted at 27. Such universal pivot is accomplished partially by a small roof-shaped bearing 28 which serves as a pivot point for the lower side of arm 26 (not shown). This is in essence a point-type contact with the arm 26. The universal pivot also includes a flexible sheet 31, for example, of material such as polyimide (sold under the trademark CAPTON). The sheet 31 is adhered to the top of arm 26 and continues to its end which has the magnetic circuit means. Referring briefly to FIG. 4, the various coils 22a–22d and 23a–23d are printed on a plurality of these flexible sheets which are 31a, 31b and 31c which in the area of the magnetic circuit are superimposed on one another. This is also illustrated in FIG. 2 which shows, because of the multi-layering, that it is thicker at that end.

To connect all of the coils of FIG. 4, a pair of wire conductors extend through the material 31 indicated at 32a and 32b in FIG. 3. And then they are coupled to a suitable processor to provide a measurement of caliper. The polyimide sheet 31 in conjunction with the pivot point 27 thus provides two dimensions of flexibility; one perpendicular to the moving sheet and the other a rolling-type flexibility which allows the end of the arm 26 to make a line contact with the sheet material as indicated at 33. On the other hand, the sheet 31 prevents or restrains motion parallel to the plane of the moving sheet material 10.

Figures 6, 7:
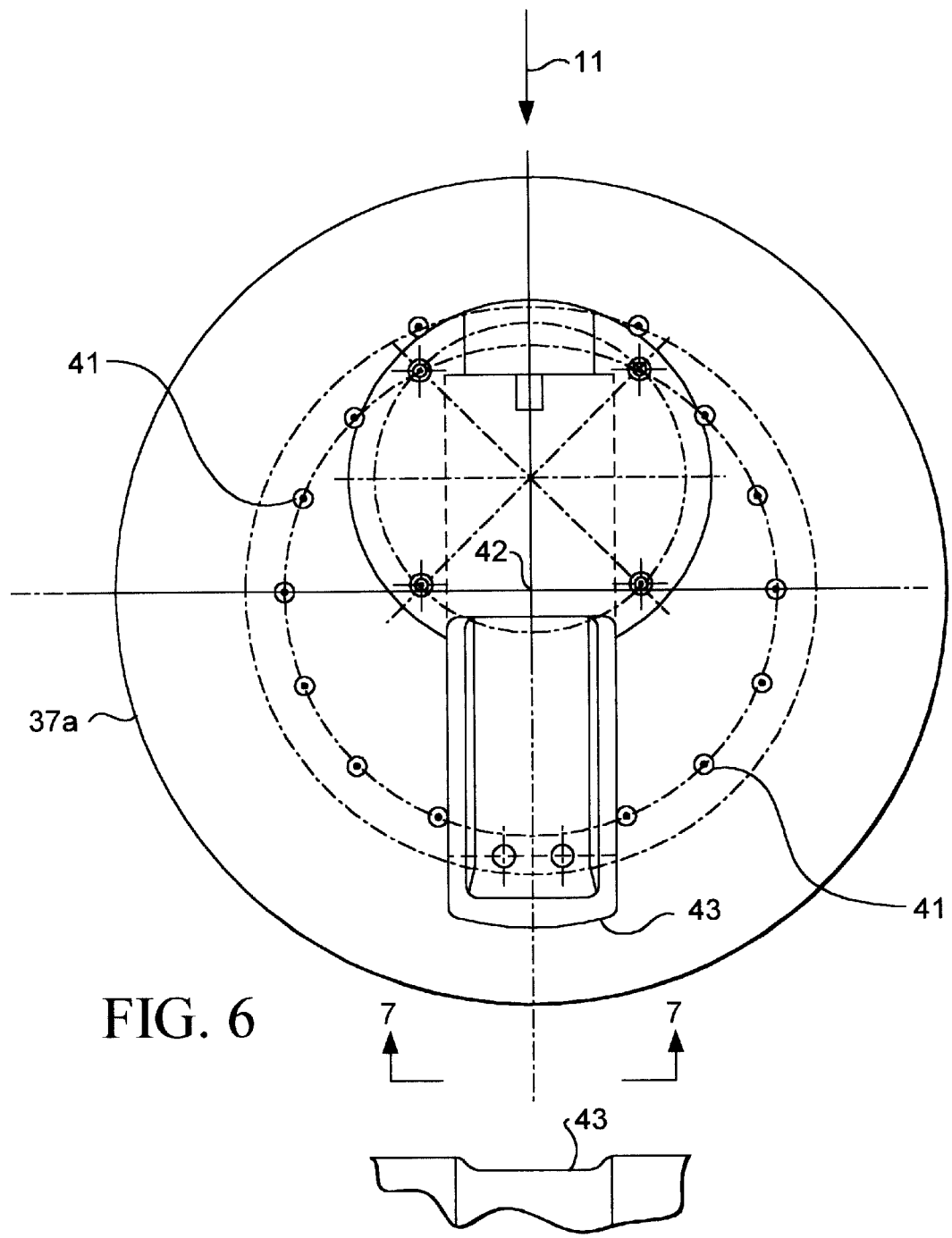
FIG. 6 is a plane view which is simplified taken substantially along the line 6—6 of FIG. 1.
FIG. 7 is an end elevational view taken along the line 7—7 of FIG. 6.

The integration of the structures of FIGS. 2, 3 and 4 is shown more clearly in FIG. 1. Each scanning head portion shown in FIG. 1 is flexibly supported from its respective transverse head by flexible rubber rings 36a and 36b. See U.S. Pat. No. 5,132,619 for a similar-type of support structure. The rubber rings, respectively, support rigid ring portions 37a and 37b which carry the remaining structure of the caliper gauge of the present invention. Rings 36a and 37b have around their periphery as best shown in FIG. 6 (in the case of ring 37a) a plurality of spaced air exits 41 which many lie on a circular path around the center of 42 of the ring-like structure 37a. The opposite ring 37b has similar air exits. Air exiting these respective apertures provides an air bearing between the rings and the moving sheet 10. Moreover, these air bearings tend to flatten the portion of the sheet encompassed by the air bearings to provide a relatively small gap through which the moving sheet passes. For example, the gap of the air bearings may typically be 300 micrometers ($\mu$m) and the thickness of a typical thin newsprint paper sheet is 75 micrometers ($\mu$m).

As illustrated in FIG. 1, deformities or non-linearities or bumps on the paper sheet may be present due to use of recycled paper as illustrated by the bump 10a in FIG. 1. In addition to the caliper gauge system including its arm 26 and lower bearing 24 accommodating this bump, the air bearing itself must accommodate the bump 10a if a slight tear starts to develop which may have a height greater than the normal gap between the rings 37a, 37b. Thus, as illustrated in the plane view of FIG. 6 and the cross-section of FIG. 7, an open channel 43 is provided to allow at least the downstream passage of a tear after passing through the measuring apparatus or, that is, the caliper gauge.

Still referring to FIG. 1, the lower magnetic ferrite slab 24 is also flexibly mounted on an arm 46 at a rounded pivot point 47. The other end of the arm is pivoted at 48 in the same manner as the arm 26. To retain the ferrite slab 24 on the pivot point 47, a polyimide ribbon of material 49 extends from the pivot point 48 and is sandwiched between the ferrite slab and another thin backing plate 51 and then continues around the backside of the arm at 49a. The location of the arms 26 and 46 in the upper or lower heads is merely for technical convenience and gravity does not play any effect on operation. Both arms are biased into contact with the sheet by use of air inlets 61 and 62 for high pressure air which, as indicated by the arrows, push on resilient domes 63 and 64, respectively, which bear against the respective arms.

As an alternative to use of a separate pivoted plate 51 (and ferrite slab 24) on pivot point 48, the slab 24 may be affixed directly on arm 46. The pivot point 48 for an arm 46 still allows two degrees of movement. And with the flexibility of the upper arm 26, the lower arm is less critical.

If a discontinuity such as a hole or bump does pass through the caliper gauge of the contacting type (such as the present), it must pass between two opposing surfaces. Thus, there is a significant mass to move compared to the weight of the thin paper sheet itself which is one or two orders of magnitude lower. (Of course, in other parts of the air bearing there is no mass to move so it easily passes through given the gap provided by the air bearing.) In order to accommodate this inertia, when the paper enters into the wedge-type area 56, as shown in both FIGS. 1 and 2, between the arm 26 and the lower ferrite plate 24 the angle of the arm with the paper, must be gentle or gradual enough to allow the arm 26 and its associated lower pivot 24 and 46 to be moved. Thus, a gradual 2° angle provides enough time for a transfer of momentum to take place from a bump to the arms. Whether the hole or bump is on the upper or lower side of the paper makes no difference since it is still trapped between the double-sided sensing caliper gauge and thus must move both of the sensing elements. The gradual 2° angle is provided by the relatively long distance L, illustrated in FIG. 2 between the pivot point of the arm 26 and the active gauge portion and the relatively small gap provided by the air bearing and in addition the technique of mounting the arm 26 (and also the arm 46) in close proximity to the paper sheet Specifically, an insert 57 in the bottom of the ring 37a adjacent paper sheet 10 and its extension 57a provides an effective wall protecting the universal joint from the rather harsh ambient conditions and forms a part of the joint as shown at 28 in FIG. 3.

It is desired to provide a measurement error of less than ½ micrometer in measuring caliper or thickness. To accomplish this, despite the pivoting of the arm 26 which, of course, changes the relationship of the ends of the magnetic pole piece 21 to the moving paper sheet 10, the end of arm 26 through which the pole piece extends as illustrated in FIG. 2 has a 2 mm radius of curvature, R. Thus, when arm 26 moves in a direction up and down (or perpendicular) to the moving direction 11 of paper sheet 10, since the radius of curvature is centered on the pole piece 21, a shift upwardly, for example, means a greater gap in the downsheet direction and a lesser gap in the upsheet direction. This compensates the angular movement of arm 26. And, of course, the amount of movement is relatively small because of the length L (indicated in FIG. 2) of the arm and its mounting in close proximity to the moving sheet which provides about a 2° angle. However, even though arm 26 is made of sapphire in the preferred embodiment or alternatively could be a diamond-coated titanium or invar, some wear will occur reducing the error compensating radius of curvature R. When this occurs, however, the fact that the length of the arm L is equal or 20 times greater than the distance 1, which is the center of the pole piece to the end of the pole piece, (1 being, for example 2.5 mm, and L equal to 50 mm), any angular movement of arm 26 (of course, within its very restricted range of movement) still provides an error of less than ½ micrometer. However, even with the radius of curvature the long length of the arm 26 is necessary to provide a very gradual wedge-shaped opening so that the momentum of any bump 10a in the paper can be gradually transferred to the caliper gauge arm system. This, thus, avoids in most cases any tears. If a tear does occur, it is minimized and it is allowed to pass through the air bearing system via the channel 43 (see FIGS. 6 and 7 discussed above). Any non-linearity or non-smoothness in the arm 26 especially near the active measuring end cannot be tolerated. Therefore, a unitary one-piece construction is preferred. This also makes possible lighter weight and therefore less inertia.

Thus, an improved contacting thickness gauge removing sheet material has been provided.

What is claimed is:

1. A contacting thickness gauge for moving sheet material having imperfections in the form of bumps or holes which may cause tears when passing through the gauge comprising:

upper and lower air bearings on opposite sides of the sheet for carrying first and second magnetic circuit means for measuring said thickness;

said upper and lower air bearings including a plurality of spaced air exits tending to flatten a portion of said sheet encompassed by said air bearings and to provide a relatively small gap through which said sheet passes;

one of said upper and lower air bearings including a continuous smooth arm having two ends with one end including said first magnetic circuit means having a magnetic pole piece in line contact (2l) with said moving sheet, and the other end being universally pivoted on said air bearing in close proximity to said sheet, said arm forming a continuous, gradual, smooth wedge-shaped opening for said moving sheet and having a length much greater than said line contact to minimize measurement errors due to pivoting of said arm caused by movement of said material perpendicular to its moving direction.

2. A contacting thickness gauge as in claim 1, where said arm is constructed of a unitary, one-piece, material.

3. A contacting thickness gauge as in claim 2, where said material is sapphire.

4. A contacting thickness gauge as in claim 1, where said universal pivot of said arm includes a flexible sheet adhered to said arm and fastened at an end free of said arm, to said one of said upper and lower means to provide two dimensions of flexibility.

5. A contacting thickness gauge as in claim 4, where said universal pivot also includes a point contact with said arm.

6. A contacting thickness gauge as in claim 4, where said flexible sheet is stiff enough to prevent substantial motion parallel to the plane of the moving sheet material.

7. A contacting thickness gauge as in claim 1, where said other of said upper and lower air bearings includes flexibly mounted magnetic circuit means.

8. A contacting thickness gauge as in claim 4, where said flexible sheet at said one end of said arm which carries said magnetic circuit means includes a plurality of layered inductive wire coils printed on a plurality of said sheets, which are superimposed on another at said one end of said arm.

9. A contacting thickness gauge as in claim 8, where said flexible sheet carries a pair of wires from said coils to said fastened end.

10. A contacting thickness gauge as in claim 9, where said plurality of coils have a sufficient number of turns to make insignificant any inductance between said pair of wires.

11. A contacting thickness gauge as in claim 1, where said one end of said arm in substantial contact with the moving sheet has a radius of curvature for compensating for measurement errors caused by pivotal movement of said arm due to movement of said moving sheet material perpendicular to its moving direction.

12. A contacting thickness gauge as in claim 1, where said pivoted arm has a predetermined length from said pivot point to said one end and the ratio of said length to the distance l of said pole piece is greater than 20 to minimize measurement errors due to pivoting of said arm.

13. A contacting thickness gauge as in claim 1, where said air bearing means includes an open channel in said moving sheet direction, after said one end of said arm, to provide additional clearance whereby accidental tears in a sheet can be accommodated.

14. A contacting thickness gauge as in claim 1, where said wedge-shaped opening has an angle of substantially 2°.

15. A contacting thickness gauge as in claim 14, where said universal pivot is in close proximity to said moving sheet to provide said 2° angle in combination with the actual length of said arm.

* * * * *